United States Patent [19]

Kwan

[11] Patent Number: 4,606,574
[45] Date of Patent: Aug. 19, 1986

[54] SUN SHADE FOR VEHICLE SUNROOFS

[75] Inventor: Gerald A. Kwan, Pasadena, Calif.

[73] Assignee: LeVan Specialty Co., Inc., City of Industry, Calif.

[21] Appl. No.: 518,474

[22] Filed: Jul. 29, 1983

[51] Int. Cl.[4] ............................ B60J 7/11; B60J 7/185
[52] U.S. Cl. .................................... 296/218; 296/224; 49/63; 49/451
[58] Field of Search ............... 296/211, 215, 216, 218, 296/220-224; 49/449-451, 61, 62, 63

[56] References Cited

U.S. PATENT DOCUMENTS

| 2,440,026 | 4/1948 | Smith | 49/451 |
| 3,033,608 | 5/1962 | Golde | 296/215 |
| 3,345,778 | 10/1967 | Brand | 49/450 |
| 3,691,686 | 9/1972 | Donegan | 49/63 |
| 3,964,784 | 6/1976 | Prechter et al. | 296/215 |
| 4,161,336 | 7/1979 | Le Van et al. | 296/218 |
| 4,175,784 | 11/1979 | Schatzler et al. | 296/222 |
| 4,274,672 | 6/1981 | Kuroda | 296/220 |
| 4,379,586 | 4/1983 | Kaltz et al. | 296/222 |
| 4,428,155 | 1/1984 | Kwan et al. | 49/465 |

FOREIGN PATENT DOCUMENTS 0054433  6/1982  European Pat. Off. ............ 296/216

Primary Examiner—Robert B. Reeves
Assistant Examiner—Dennis H. Pedder
Attorney, Agent, or Firm—Francis X. LoJacono

[57] ABSTRACT

The present invention is directed to a sun-shade apparatus for use in combination with a vehicle sunroof of the type that includes a hinged panel having recessed hinge devices and a recessed latch handle that do not project below the frame structure of the sunroof. The sun shade includes a frame structure having a substantially U-shaped configuration defining a channel in which a sun shade is slidably mounted for selective positioning between a closed mode to an fully opened mode.

3 Claims, 5 Drawing Figures

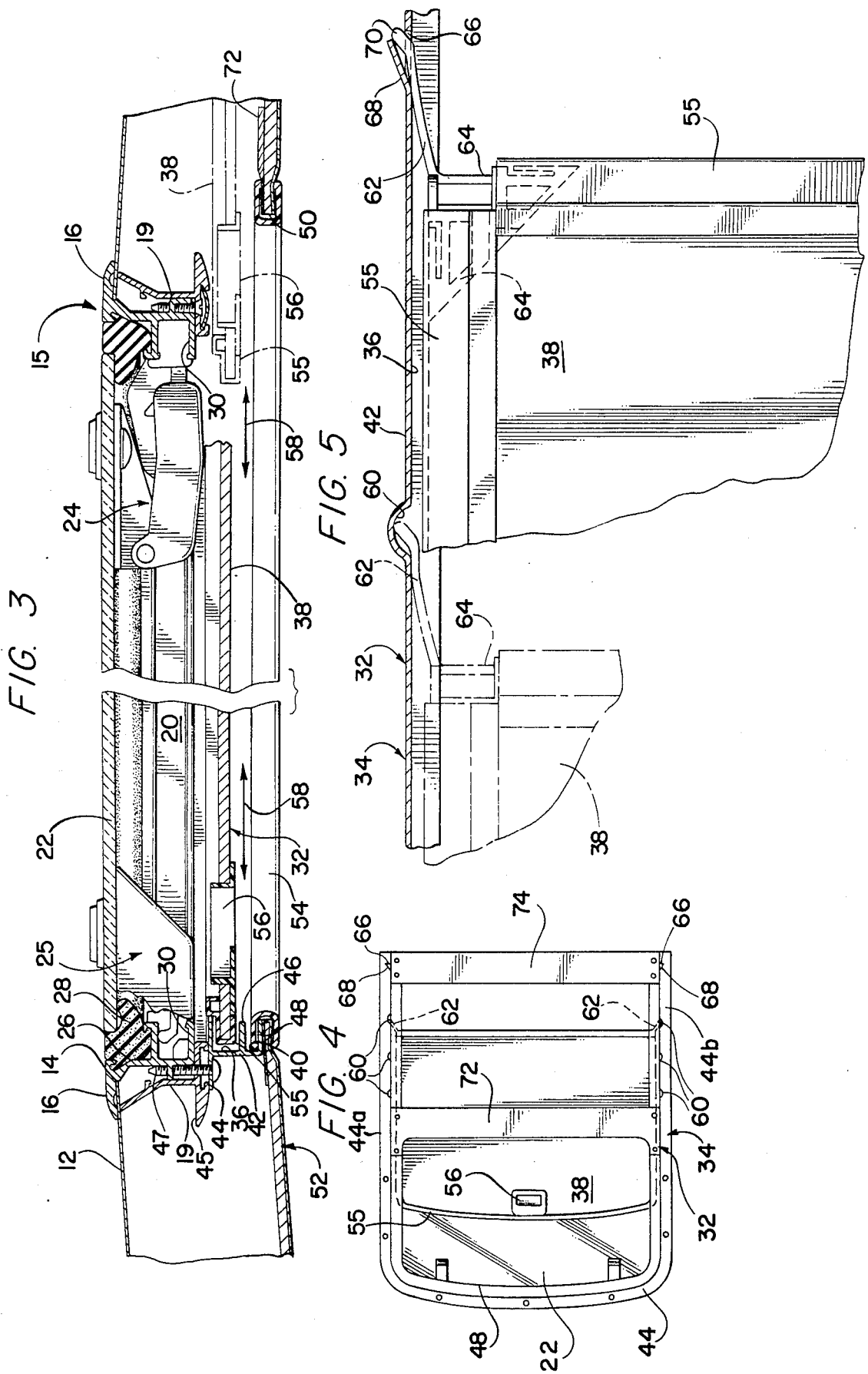

SUN SHADE FOR VEHICLE SUNROOFS

BACKGROUND OF THE INVENTION

1. Field of the Invention

This invention relates to a sun shade for vehicles, and more particularly to a sun shade used in combination with a sunroof for vehicles.

2. Description of the Prior Art

There are problems and difficulties in providing suitable means for shading the sun entering the interior of a vehicle through the glass panel of a sunroof, particularly with respect to the manually operated type of sunroof that is installed in the roof of a vehicle.

Due to the fact that such sunroofs are generally installed as after-market units and because of the their design restrictions, sun shades or visors generally have not been compatible with the sunroofs. For example, shade devices have not been practical for use with those types of sunroofs that have hinged glass panels. This is mainly due to the configurational limitations of the frame structure, and the hinge and latch mechanisms employed with such frame structures. Also, the panels must be hinged along their leading edges to the framework; and the releasable latch devices must be mounted along the gear of the framework. Until now, the known hinges and latches have been designed to project below the inner framework of a sunroof. Hence, a shade device could not be employed to extend across the framework in order to cover the glass panel in a practical manner, without interfering with the operation of the sunroof or protruding below the interior headliner of the vehicle.

With the advent of the applicant's new recessed-hinge device together with a new recessed-latch mechanism, it is now possible to combine a sunroof of this type with a sliding sun shade.

SUMMARY OF THE INVENTION

The present invention has for an important object to provide a sliding-type sun shade which is compatible with a vehicle sunroof having a hinged glass panel.

It is another object of the invention to provide a sun shade that is allowed to slide to a closed position so as to cover the area below the sunroof glass panel, and yet not protrude below the frame structure of the vehicle headliner. Still another object of the invention is to provide a sun shade of this character that can be positioned to a fully opened mode, without limiting the configuration or interfering with the operation of the related hinges and latching mechanism, the shade being stored in an open mode rearwardly of the glass panel and behind the headliner of the vehicle.

A further object of the invention is to provide a device of this character wherein the sun shade is slidably mounted within a somewhat-U-shaped-track section that is secured to the underside of the sunroof-frame structure, and wherein the hinges and latching mechanism are designed to have a low profile so that they do not project below the lower-horizontal portion of the frame structure, allowing the shade to be positioned directly under and adjacent the bottom of the frame structure.

A still further object of the invention is to provide a device of this character that is adapted to be mounted between the sunroof-frame structure and the headliner, the headliner being secured to the peripheral edges of the sun-shade track.

It is a further object of the invention to provide a sun shade of this character that has relatively few operating parts, and is easily installed in a vehicle.

It is still a further object of the invention to provide a sun shade to be employed in combination with a sunroof, the shade being relatively inexpensive to manufacture and simple to service and maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 3 is an enlarged cross-sectional view of the sunroof and shade device taken substantially along line 3—3 of FIG. 1, with the shade in a closed mode or operation, and the hinges and latch mechanism recessed within the framework of the sunroof;

FIG. 4 is a bottom-plan view of a sunshade and its associated frame structure which defines the supporting track thereof; and FIG. 5 is a top-plan view of one of the rear corners of the sun shade, showing a lock-positioning device mounted to the shade to regulate its sliding movement within its track, the track being shown in section.

DESCRIPTION OF THE PREFERRED EMBODIMENT

Figure 1:
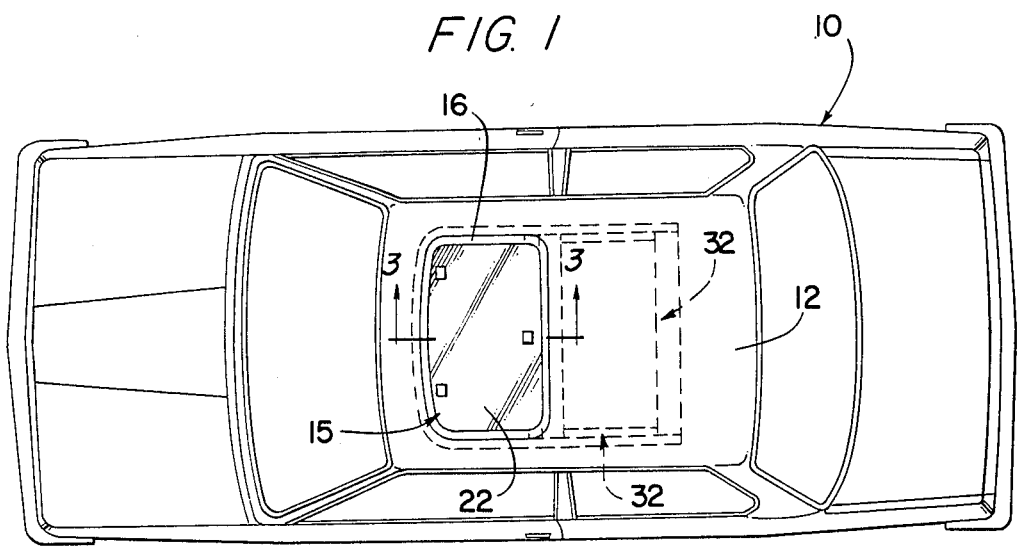
FIG. 1 is a top-plan view of a vehicle having a typical hinged-panel sunroof showing the present invention mounted therein.
Figure 2:
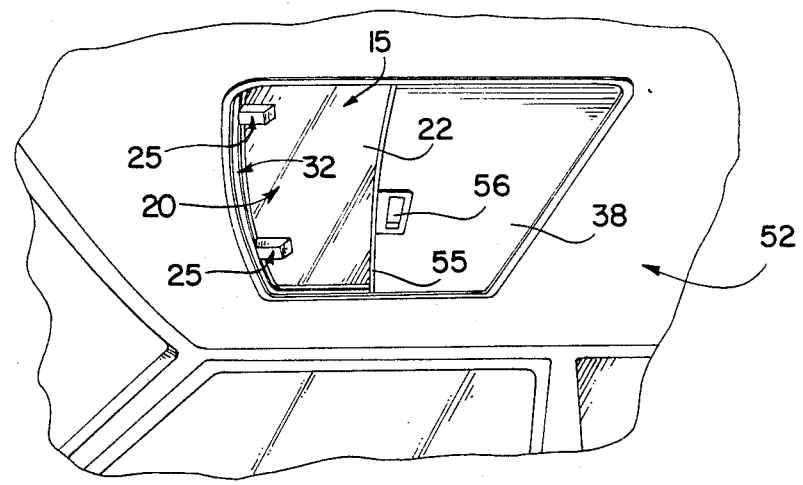
FIG. 2 is a pictorial view of the headliner of the vehicle roof, with the sun shade opened half way across the window panel, and showing the recessed or low-profile hinges.

Referring more particularly to FIG. 1, there is shown a top-plan view of a vehicle, generally indicated at 10, having a roof 12. Roof 12 has been provided with an opening 14, as illustrated in FIG. 3. Within opening 14 a sunroof, designated at 15, is mounted in a suitable manner. Sunroof 15 comprises a somewhat rectangular frame structure 16, fixedly secured to roof 12 about the peripheral edge of opening 14 by means of an annular clamping ring 19, illustrated in FIG. 3. Frame structure 16 defines an access opening 20 which is closed by a hinged glass panel or window 22. Panel 22 is shown in a locked or closed mode by a releasable latch handle, indicated generally at 24, which must be designed as a low-profile type so as to be compatible with a pair of low-profile, releasable-hinge devices, indicated at 25.

It is well known that such panels as 22 illustrated in FIG. 3 are normally provided with a single-latch device 24 which is centrally positioned along the trailing edge of the panel, so as to cooperate with a pair of oppositely positioned hinge devices, designated at 25.

Hence, frame structure 16 is formed with an upper channel 26 adapted to receive a sealing member 28 therein for peripheral engagement with panel 22, when the panel is in a closed or sealed position, as illustrated herein. Frame structure 16 includes a second, lower, peripheral channel 30 which is arranged to receive and support the hinges and latch device in a suitable manner.

Accordingly, the present invention, which is a sun-shade device indicated generally at 32, comprises a framework 34 having a substantially U-shaped configuration. The framework is formed having an upper channel 36 which defines the track in which sun-shade panel 38 is slidably mounted. A lower channel 40 is contiguously formed therewith, whereby channels 36 and 40 are defined by vertical wall 42 having a horizontal cap wall 44, an intermediate partition wall 46, and a bottom flange 48. The horizontal cap wall 44 extends laterally to each side of vertical wall 42, providing a means for securing the sun-shade framework 32 to the sunroof framework 15. That is, the outwardly extended portion of wall 44 is abutted against the lower flange 45 of clamp 19, both the wall 44 and the flange 45 being adapted to receive screws 47 which are threaded to the sunroof frame structure 16. Thus, screws 47 secure clamp member 19 to frame 16 and roof 12, and further secure sun-shade frame 34 below the sunroof structure, whereby sun-shade panel 38, when in a closed mode, completely covers glass panel 22 as seen in FIG. 3.

When the present device is installed with the sunroof, a matching opening 50 is cut in the headliner 52 of the vehicle. The peripheral edge of the opening is secured to the structure by means of a continuous pinch-type molding 54. As seen in FIG. 3, molding 54 is force-fitted over the peripheral edge of headliner and the bottom flange 48 of shade framework 34.

Sun-shade panel 38 can be constructed from any suitable material that is stiff enough not to sag, and which can be readily covered by the same material employed for the headliner 52, thereby providing a very pleasing arrangement without the need for unsightly projecting members within the interior of the vehicle. In order to provide a sturdy structure, shade panel 38 includes a peripheral, rigid, molding member 55 and a recessed pull plate 56 for moving the shade logitudinally back and forth within track 36, as indicated by arrows 58.

Means are further provided to open shade 38 in positioning variations between a closed to a fully open mode. There is also a means to prevent the shade from being inadvertently removed from track 36. The shade-positioning means comprises a plurality of indentations 60 which are formed along wall 42, and are adapted to receive a latch arm 62 which is part of a latching means comprising a wedge-shaped body member 64 secured at the opposite rear corners of the shade, as seen in FIGS. 4 and 5. Latch arm 62 extends outwardly and angularly from the respective corners, a spring-biasing means being built into the latch itself which is formed generally from a plastic material suitable for this purpose. The biasing force of latching arm 62 is sufficient to hold the shade in a selective position, and can be readily forced from the indentations 60 by pushing or pulling the shade in the direction desired.

A stop means is also included which employs latching arm 62. The stop means comprises slots 66 which are oppositely disposed from each other. That is, one slot 66 is formed in channel or track 36 at one end, and a second matching slot 66 is formed in the track at the opposite end. (See FIGS. 4 and 5.) Each slot 66 includes an angularly bent tab 68. Thus, when sun shade 38 is positioned in a fully open mode as indicated in phantom lines in FIG. 3 and full lines in FIG. 5, the tip 70 of arm 62 will catch in slot 66, thus preventing further rearward movement. Accordingly, the shade can be pulled forwardly as tip 70 of arm 62 slides over tab 68 for forward movement. Since the shade and its associated frame is positioned below the sunroof structure, access to the shade must be from the inside of the vehicle.

In order to strengthen the parallel rail sections 44a and 44b of the sun-shade frame 34, there is provided a forward strut member 72 which also defines the opening of the sun-shade device. A second rearward strut member 74 is secured transversely adjacent the terminating ends of frame structure 34, as seen in FIG. 4. Hence, rail sections 44a and 44b are held in fixed parallel relationship to each other, allowing shade 38 to freely slide therebetween.

It is important to note that at no time does either the hinge device 25 or the latch handle 24 ever drop below the sunroof-frame structure so as to cause an obstruction in the movement of the shade 38.

U.S. Pat. Nos. 4,428,155 to Gerald A. Kwan et al, and No. 4,484,773 to John Lehne are related to the arrangement of the hinge and latch-handle means of the low-profile sunroof as illustrated in the accompanying drawings, these patents having the same assignee as in the present invention.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A sun shade apparatus in combination with a vehicle sunroof of the type having a hinged panel, said combination comprising:
   a vehicle sunroof having a substantially rectangular frame structure;
   a glass panel hingedly mounted to said sunroof-frame structure;
   hinge means mounted between said glass panel and said sunroof-frame structure; a latching-handle means mounted between said glass panel and said sunroof-frame structure, wherein said hinge means and said latching-handle means are formed having a low profile, whereby said hinge and latching-handle means are positioned within the opening defined by said sunroof-frame structure so as not to project below said sunroof-frame structure when said panel is in either an opened or a closed mode; and
   a sun-shade appartus comprising:
   a sun-shade framework adapted to be positioned below said sunroof-frame structure an secured thereto,
   said sun-shade framework having a first channel formed therein,
   a sun-shade panel adapted to b slidably mounted within said first channel,
   means formed on said sun-shade framework for attaching the headliner of said vehicle thereto,
   means formed within said channel for positioning said sun-shade panel longitudinally within said channel between a closed and and opened mode, and means formed within said channel for limiting the rearward movement of said sun-shade panel to prevent said shade from being removed from said channel;

said attaching means comprising:

an extended peripheral flange member; and clamping means adapted to clamp said headliner to said flange member, said sun-shade framework being formed having a substantially U-shaped configuration defined by a forward, transverse, channel section and a pair of parallel, rearwardly extending, side-channel sections; and said channel sections including at least one tranverse strut member connecting said parallel, side-channel sections.

2. The combination as recited in claim 1, wherein said shade-positioning means comprises:

a plurality of detents formed in said side-channel sections; and a pair of latching arms mounted on opposite sides of said sun shade and positioned to selectively engage said detents.

3. The combination as recited in claim 2 wherein said limit means comprises:

a slot formed in each of said side-channel sections for engagement with said latching-arm member; and an angularly disposed tab member positioned within said slot for engagement with said latching-arm member.

* * * * *